(12) United States Patent
Hotelling et al.

(10) Patent No.: US 8,319,747 B2
(45) Date of Patent: Nov. 27, 2012

(54) SINGLE LAYER TOUCH PANEL WITH SEGMENTED DRIVE AND SENSE ELECTRODES

(75) Inventors: Steve Porter Hotelling, San Jose, CA (US); Martin Paul Grunthaner, San Francisco, CA (US); Marduke Yousefpor, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 737 days.

(21) Appl. No.: 12/333,250

(22) Filed: Dec. 11, 2008

(65) Prior Publication Data

US 2010/0149108 A1 Jun. 17, 2010

(51) Int. Cl.
  *G06F 3/045* (2006.01)
  *G06F 3/041* (2006.01)
(52) U.S. Cl. ......................................... 345/174; 345/173
(58) Field of Classification Search .................. 345/173, 345/174
  See application file for complete search history.

(56) References Cited

U.S. PATENT DOCUMENTS

| | | | |
|---|---|---|---|
| 4,304,976 A | 12/1981 | Gottbreht et al. | |
| 4,659,874 A | 4/1987 | Landmeier | |
| 5,194,862 A | 3/1993 | Edwards | |
| 5,317,919 A | 6/1994 | Awtrey | |
| 5,459,463 A * | 10/1995 | Gruaz et al. | 341/33 |
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,129,935 B2 | 10/2006 | Mackey | |
| 7,184,064 B2 | 2/2007 | Zimmerman et al. | |

(Continued)

FOREIGN PATENT DOCUMENTS

CN 1672119 A 9/2005

(Continued)

OTHER PUBLICATIONS

Great Britain Search Report mailed Jan. 19, 2010, for GB Application No. GB0817242.1, filed Sep. 22, 2008, two pages.

(Continued)

*Primary Examiner* — Alexander Eisen
*Assistant Examiner* — Mark Regn
(74) *Attorney, Agent, or Firm* — Morrison & Foerster LLP (57) ABSTRACT

A touch sensor panels having segmented electrodes for both the drive and sense lines. The touch sensor panel may include a number of columns of sense electrodes and a number of rows of drive electrodes. Each of the drive and sense electrodes are connected to one of the metal bus lines using a connecting trace. Pixels on the touch sensor panel are formed by the unique pairings of individual drive electrodes and their adjacent sense electrodes. Electrically, the mutual capacitance of one touch-sensing pixel can be distinguished from the mutual capacitance of another touch sensing pixel because the two mutual capacitances are formed with combinations of different drive electrodes and sense electrodes. In one embodiment, the drive electrodes and sense electrodes in adjacent columns are staggered horizontally with respect to each other by half a Y-pitch of the electrodes.

28 Claims, 8 Drawing Sheets

U.S. PATENT DOCUMENTS

| | | | |
|---|---|---|---|
| 7,538,760 | B2 | 5/2009 | Hotelling et al. |
| 7,663,607 | B2 | 2/2010 | Hotelling et al. |
| 2004/0017362 | A1 | 1/2004 | Mulligan et al. |
| 2004/0090429 | A1 | 5/2004 | Geaghan et al. |
| 2004/0239650 | A1 | 12/2004 | Mackey |
| 2005/0073507 | A1 | 4/2005 | Richter et al. |
| 2005/0083307 | A1 | 4/2005 | Aufderheide et al. |
| 2006/0026521 | A1 | 2/2006 | Hotelling et al. |
| 2006/0097991 | A1 | 5/2006 | Hotelling et al. |
| 2006/0197753 | A1 | 9/2006 | Hotelling |
| 2007/0008299 | A1 | 1/2007 | Hristov |
| 2007/0247443 | A1 | 10/2007 | Philipp |
| 2008/0074398 | A1 | 3/2008 | Wright |
| 2008/0158181 | A1 | 7/2008 | Hamblin et al. |
| 2008/0264699 | A1 | 10/2008 | Chang et al. |
| 2008/0277259 | A1 | 11/2008 | Chang |
| 2008/0309633 | A1 | 12/2008 | Hotelling et al. |
| 2008/0309635 | A1 | 12/2008 | Matsuo |
| 2009/0002337 | A1 | 1/2009 | Chang |
| 2009/0019344 | A1 | 1/2009 | Yoon et al. |
| 2009/0054107 | A1 | 2/2009 | Feland et al. |
| 2009/0091551 | A1 | 4/2009 | Hotelling et al. |
| 2009/0236151 | A1 | 9/2009 | Yeh et al. |
| 2009/0242283 | A1 | 10/2009 | Chiu |
| 2009/0267902 | A1 | 10/2009 | Nambu et al. |
| 2009/0309850 | A1 | 12/2009 | Yang |
| 2009/0314621 | A1 | 12/2009 | Hotelling |
| 2009/0315854 | A1 | 12/2009 | Matsuoo |
| 2010/0149108 | A1* | 6/2010 | Hotelling et al. ............. 345/173 |
| 2011/0007020 | A1 | 1/2011 | Hong |

FOREIGN PATENT DOCUMENTS

| | | |
|---|---|---|
| CN | 1711520 A | 12/2005 |
| CN | 1818842 A | 8/2006 |
| CN | 1864124 A | 11/2006 |
| CN | 101046720 A | 10/2007 |
| CN | 101071354 A | 11/2007 |
| EP | 1 192 585 A1 | 4/2002 |
| EP | 1 192 585 B1 | 4/2002 |
| EP | 1 573 706 A2 | 9/2005 |
| EP | 1 573 706 A3 | 9/2005 |
| EP | 1 644 918 A2 | 4/2006 |
| EP | 2 077 489 A1 | 7/2009 |
| GB | 1 546 317 A | 5/1979 |
| GB | 2 144 146 A | 2/1985 |
| GB | 2 428 306 A | 1/2007 |
| GB | 2 437 827 A | 11/2007 |
| JP | 2000-163031 A | 6/2000 |
| JP | 2002-342033 A | 11/2002 |
| TW | M344522 | 11/2008 |
| TW | M344544 | 11/2008 |
| WO | WO-2005/114369 A2 | 12/2005 |
| WO | WO-2005/114369 A3 | 12/2005 |
| WO | WO-2006/104745 A2 | 10/2006 |
| WO | WO-2006/104745 A3 | 10/2006 |
| WO | WO-2007/034591 A1 | 3/2007 |
| WO | WO-2008/135713 A1 | 11/2008 |
| WO | WO-2009/046363 A1 | 4/2009 |
| WO | WO-2009/132146 A1 | 10/2009 |
| WO | WO-2010/117882 A2 | 10/2010 |

OTHER PUBLICATIONS

Lee, S.K. et al. (Apr. 1985). "A Multi-Touch Three Dimensional Touch-Sensitive Tablet," *Proceedings of CHI: AAM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Feb. 4, 2011, for U.S. Appl. No. 12/038,760, filed Feb. 27, 2008, 18 pages.

Cassidy, R. (Feb. 23, 2007). "The Tissot T-Touch Watch—A Groundbreaking Timepiece," located at <http://ezinearticles.com/?The-Tissot-T-Touch-Watch—A-Groundbreaking-Tirnepiece&id . . . >, last visited Jan. 23, 2009, two pages.

Chinese Search Report mailed Jan. 10, 2011, for CN Application No. 2008201338142, filed Sep. 27, 2008, with English Translation, 23 pages.

International Search Report mailed Jan. 14, 2011, for PCT Application No. PCT/US2010/029698, filed Apr. 1, 2010, 5 pages.

Chinese Search Report mailed Jan. 7, 2011, for CN Application No. 2009200081997, filed Apr. 24, 2009, with English Translation, 14 pages.

Final Office Action mailed Jun. 8, 2011, for U.S. Appl. No. 12/038,760, filed Feb. 27, 2008, 20 pages.

European Search Report mailed Mar. 19, 2009, for EP Application No. 08017396.6, filed Oct. 8, 2008, seven pages.

Great Britain Search Report mailed Jan. 19, 2009, for GB Application No. GB0817242.1, filed Sep. 22, 2008, two pages.

International Search Report mailed on Mar. 19, 2009, for PCT Application No. PCT/US2008/078836, filed on Oct. 3, 2008, four pages.

International Search Report mailed Jul. 17, 2009, for PCT Application No. PCT/US2009/041460, three pages.

Non-Final Office Action mailed Jul. 8, 2011, for U.S. Appl. No. 12/110,075, filed Apr. 25, 2008, 14 pages.

* cited by examiner

SINGLE LAYER TOUCH PANEL WITH SEGMENTED DRIVE AND SENSE ELECTRODES

FIELD OF THE INVENTION

This relates generally to input devices for computing systems, and more particularly, to a touch sensor panel capable of being fabricated on a single side of a substrate.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface. The touch sensor panel can be positioned in front of a display screen so that the touch-sensitive surface covers the viewable area of the display screen. Touch screens can allow a user to make selections and move a cursor by simply touching the display screen via a finger or stylus. In general, the touch screen can recognize the touch and position of the touch on the display screen, and the computing system can interpret the touch and thereafter perform an action based on the touch event.

In some configurations, touch sensor panels can be implemented as an array of pixels formed by multiple drive lines (e.g. rows) crossing over multiple sense lines (e.g. columns), where the drive and sense lines are separated by a dielectric material. In some touch sensor panels, the row and column lines can be formed on different substrates. Such touch sensor panels can be expensive to manufacture, because processing must be performed on two different substrates. In addition, the use of two substrates can result in a thicker device. In other touch sensor panels, the drive and sense lines can be formed on the top and bottom sides of the same substrate. However, touch sensor panels having row and column lines formed on the bottom and top sides of a single substrate can also be expensive to manufacture, because thin-film processing steps must be performed on both sides of the glass substrate, which requires protective measures for the processed side while the other side is being processed.

To reduce the cost of manufacturing touch sensor panels and reduce the thickness of the panels, advanced touch sensor panels may include an array of co-planar single-layer touch sensors fabricated on a single side of a substrate. In this advanced configuration, the sense lines can be continuous and maintain their generally columnar shape, but the drive lines may need to be formed from discrete shapes (bricks) coupled in the border areas of the panel using thin connecting traces. For example, each drive line can be formed from a row of discrete bricks coupled together by thin connecting traces. However, as the size of the touch sensor panel increases, more rows of bricks are needed to maintain the sensing resolution of the panel. As a result, more connecting traces have to be squeezed into the limited amount of space between the columns of drive line bricks to connect each row. This may require the connecting traces to be made narrower, which result in an increase in the resistance of the traces. The resistance of the traces may be further increased due to the longer distance they have to traverse in a large touch sensor panel. As a result, the stimulating signal bandwidth may be reduced due to the increased time constant introduced by these narrower, higher resistance drive lines, causing the touch panel to be less sensitive and more non-uniform.

SUMMARY OF THE INVENTION

Embodiments of the present invention provide touch sensor panels having segmented electrodes (e.g., bricks) for both the drive and sense lines. By segmenting both drive and sense lines and staggering the segmented electrodes in various patterns, embodiments of the invention reduce the number of drive (or sense) electrodes in each column, thereby reducing the number of connecting traces required to connect the drive (or sense) electrodes. As a result, less space is required for routing the connecting traces, making it more practical to route all connecting traces to one edge of the touch sensor panel without sacrificing the sensitivity (or uniformity of the sensitivity) of the touch sensor panel. This can eliminate the border metal on glass routing from at least one edge of the existing touch sensor panels, thereby reducing the manufacturing cost of the touch sensor panels.

In one embodiment, the sense lines and drive lines of the touch sensor panel may be fabricated on a single side of a substrate. The touch sensor panel may include a number of columns of sense electrodes and a number of rows of drive electrodes. It should be understood that the number of columns of sense electrodes and rows of drive electrodes can vary depending on the requirements of the touch sensor panel, such as the size and sensing resolution of the panel. Each of the drive and sense electrodes are connected to one of the metal bus lines using a connecting trace.

In one embodiment, pixels on the touch sensor panel are formed by the unique pairings of individual drive electrodes and their adjacent sense electrodes. Electrically, the mutual capacitance of one touch-sensing pixel can be distinguished from the mutual capacitance of another touch sensing pixel because the two mutual capacitances are formed with combinations of different drive electrodes and sense electrodes. Therefore, it is possible to determine the proximity of a touch by detecting a change in mutual capacitance at a particular touch-sensing pixel.

In one embodiment, the drive electrodes and sense electrodes are in the shape of rectangular bricks. However, it is to be understood that the electrodes can be in other polygonal shapes that allow fringing electric field lines to form between pairs of drive electrodes and sense electrodes. The drive electrodes and sense electrodes in adjacent columns are staggered horizontally with respect to each other by half a Y-pitch of the electrodes. The horizontal staggering pattern extends all the way to the bottom electrodes in the columns and is replicated between electrodes in adjacent pairs of columns of drive electrodes and sense electrodes throughout the touch sensor panel.

With this horizontally staggered configuration of electrodes, each of the drive electrodes can be capacitively coupled to two different sense electrodes and, reciprocally, most of the sense electrodes can be capacitively coupled to two different drive electrodes. One of the advantages of this design is that less electrodes, both drive and sense, are required to provide the same sensing resolution for a panel with fixed dimensions than in previously disclosed touch sensor panels. Effectively, the number of drive electrodes in each column can be reduced by half, thus reducing the connecting traces used to connect the electrodes to the metal bus lines. Since the connecting traces do not have to be as densely packed in a limited amount of space in this embodiment, large touch sensor panels can be created without having the high-resistance connecting trace problem described above.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

In general, this relates to a single-layer touch sensor panel in which both the drive and sense lines include segmented electrodes. By segmenting both drive and sense lines and staggering the segmented electrodes in various patterns, embodiments of the invention can reduce the number of drive (or sense) electrodes in each column and reduce the number of connecting traces required to connect the drive (or sense) electrodes. As a result, a larger touch sensor panel can be fabricated while maintaining a more uniform signal strength in the drive lines. An additional benefit of having a smaller number of connecting traces is that it may be possible to route all connecting traces to one edge of the touch sensor panel, which would eliminate the border metal routing on at least one edge of the touch sensor panel and reduce the cost of manufacturing the panels.

Figure 1A:
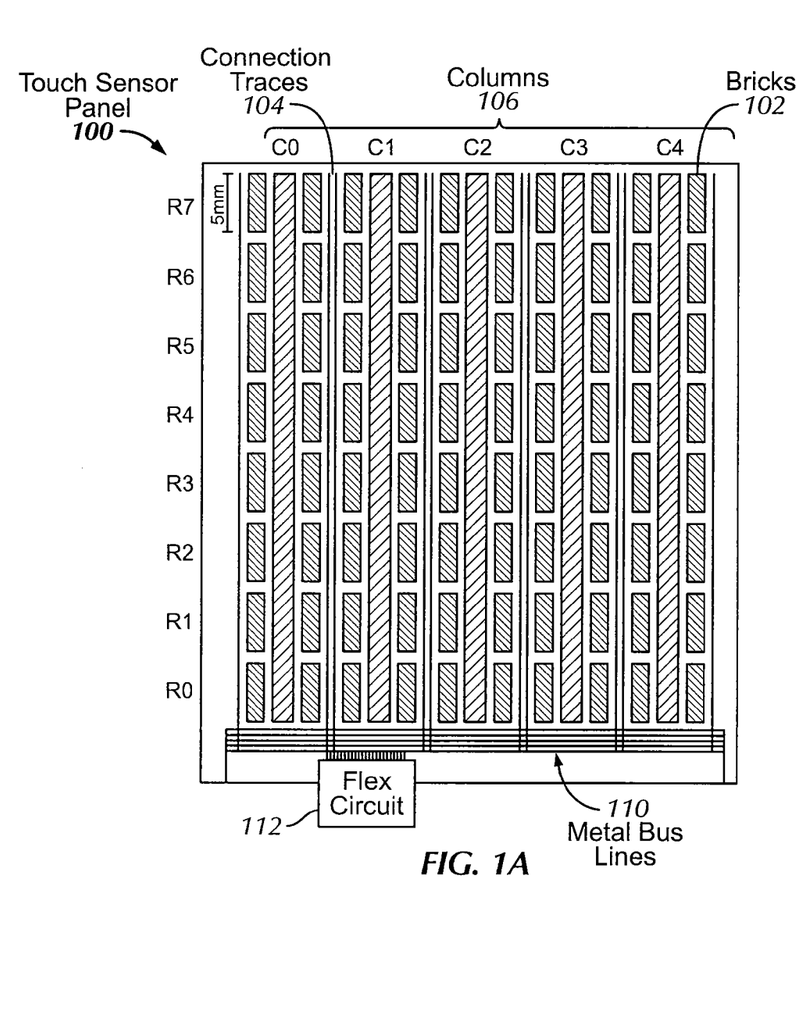
FIG. 1a illustrates an exemplary touch sensor panel including columns, rows of bricks, and connecting traces routed along only one side of the bricks.

FIG. 1a illustrates a typical touch sensor panel 100 including sense (or drive) lines (C0-C4) formed as columns 106 and rows of polygonal areas (bricks) 102, where each row of bricks forms a separate drive (or sense) line (R0-R7). All of the bricks 102 in the panel typically have the same pixel pitch (i.e., the height of each brick), which may be determined by the sense resolution of the touch sensor panel. In the example of FIG. 1a, every brick 102 has a pixel pitch of 5 mm. As illustrated, the bricks 102 are aligned on both sides of each column 106 and the connecting traces 104 are routed between two adjacent columns of bricks 102 (except for connecting traces along the borders of the panel). It is worth noting that, in this layout, the connecting traces 104 for each column of bricks 102 are routed on one side of the bricks 102 (a so-called "single escape" configuration). Although a touch sensor panel 100 having five columns and eight rows is shown, it should be understood that any number of columns and rows can be employed in similar touch sensor panels. Columns 106 and bricks 102 of FIG. 1a can be formed in a co-planar single layer of conductive material.

To couple bricks 102 in a particular row together, connecting traces 104, which are also formed from a conductive material, can be routed from the bricks 102 along one side of the bricks in a single escape configuration to a particular bus line 110. Connections for each bus line 110 and for columns 106 can be brought off touch sensor panel 100 through flex circuit 112. In touch screen manufacturing, the sense lines, drive lines, and connecting traces can be formed from a substantially transparent material such as Indium Tin Oxide (ITO), although other materials can also be used. The ITO layer can be formed on a single layer on either on the back of a coverglass or on a separate substrate.

Figure 1B:
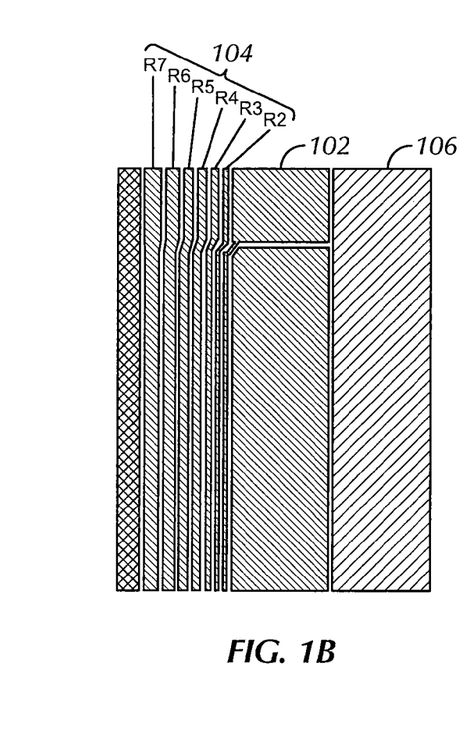
FIG. 1b illustrates a close-up view of a portion of the exemplary touch sensor panel of FIG. 1a, showing bricks routed to bus lines using connecting traces in a single escape configuration.

FIG. 1b illustrates a close-up view of a portion of the existing touch sensor panel 100 of FIG. 1a, showing how bricks 102 can be routed to bus lines 110 using connecting traces 104 in a single escape configuration. In FIG. 1b, the longer connecting traces 104 (e.g. trace R7) can be wider than the shorter connecting traces (e.g. trace R2) to equalize the overall resistivity of the traces and to minimize the overall capacitive loads seen by the drive circuitry.

Figure 1C:
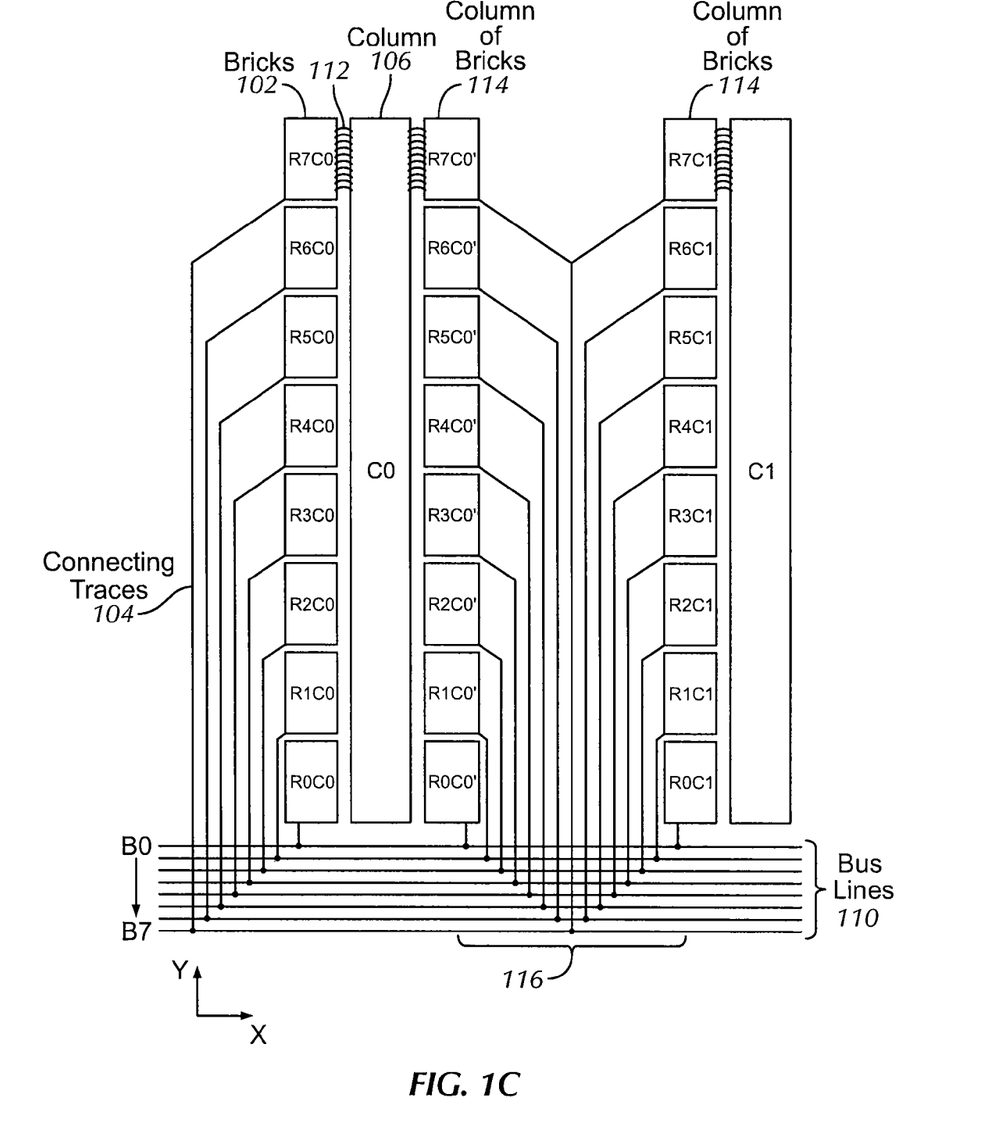
FIG. 1c illustrates a portion of the exemplary touch sensor panel of FIG. 1a, including bricks associated with columns C0 and C1 and connecting traces coupling the bricks to the bus lines.

FIG. 1c illustrates a portion of the exemplary touch sensor panel 100 of FIG. 1a including bricks 102 associated with columns C0 and C1 and connecting traces 104 (illustrated symbolically as thin lines) coupling the bricks to bus lines 110. In the example of FIG. 1c, which is drawn in a symbolic manner and not to scale for purposes of illustration only, bus line B0 is coupled to bricks R0C0, R0C0' (the closest bricks to B0 adjacent to column C0) and R0C1 (the closest brick to B0 adjacent to column C1). Bus line B1 is coupled to brick R1C0, R1C0' (the next closest bricks to B0 adjacent to column C0) and R1C1 (the next closest brick to B0 adjacent to column C1). The pattern repeats for the other bus lines such that bus line B7 is coupled to bricks R7C0, R7C0' (the farthest bricks from B0 adjacent to column C0) and R7C1 (the farthest brick from B0 adjacent to column C1). As illustrated, adjacent bricks in the top row (i.e., bricks R7C0' and R7C1) may share the same connecting trace.

To sense one or more touches using the touch sensor panel, the rows R0-R7 can be driven with one or more stimulation signals, forming fringing electric field lines 112 between adjacent column areas and bricks 102. It should be understood that although only electric field lines 112 between column C0 and brick R7C0 are shown for purposes of illustration, electric field lines can be formed between other adjacent column (or different parts of column C0) and bricks 102 (e.g., R7C0' and C0, R7C1 and C1) depending on what columns or rows are being stimulated. Each pairing of bricks 102 and columns 106 can represent a two-electrode pixel or sensor at which charge can be coupled onto the sense electrode from the drive electrode. When a finger touches down over one of these pixels, some of the fringing electric field lines that extend beyond the cover of the touch sensor panel are blocked by the finger, reducing the amount of charge coupled onto the sense electrode. The reduction in the amount of coupled charge can be detected as part of determining a resultant "image" of touch.

As the size of the touch sensor panel increases, more rows of bricks are needed to maintain the sensing resolution of the panel. As a result, more connecting traces have to be squeezed into the limited amount of space between the columns of drive line bricks to connect the bricks in each row. For example, the touch sensor panel of FIG. 1c is shown to include eight rows of bricks R0-R7 (i.e., sense lines) and thus requires a total of fifteen connecting traces 116 between the columns of bricks 114 to connect the bricks 114 in each row to a respective bus line 110. The space between the columns of bricks 114 is magnified in FIG. 1c to better illustrate the connecting traces. However, in a physical touch sensor panel, that space between the columns of bricks has to be kept to minimum to maintain the proper sensing resolution of the panel. That is, if the columns of bricks are too far apart, the touch sensitivity of the panel in the area between the bricks can be significantly reduced or even completely lost. This may require the connecting traces to be made narrower, which increases the resistance of the traces. The resistance of the traces may be further increased due to the long distance (e.g., from the top row to the bus line at the bottom of the panel) they have to be extended in a large touch sensor panel. As a result, the stimulating signal bandwidth may be reduced due to the increased time constant introduced by these narrower, higher resistance drive lines, causing the touch panel to be less sensitive and more non-uniform.

Figure 2:
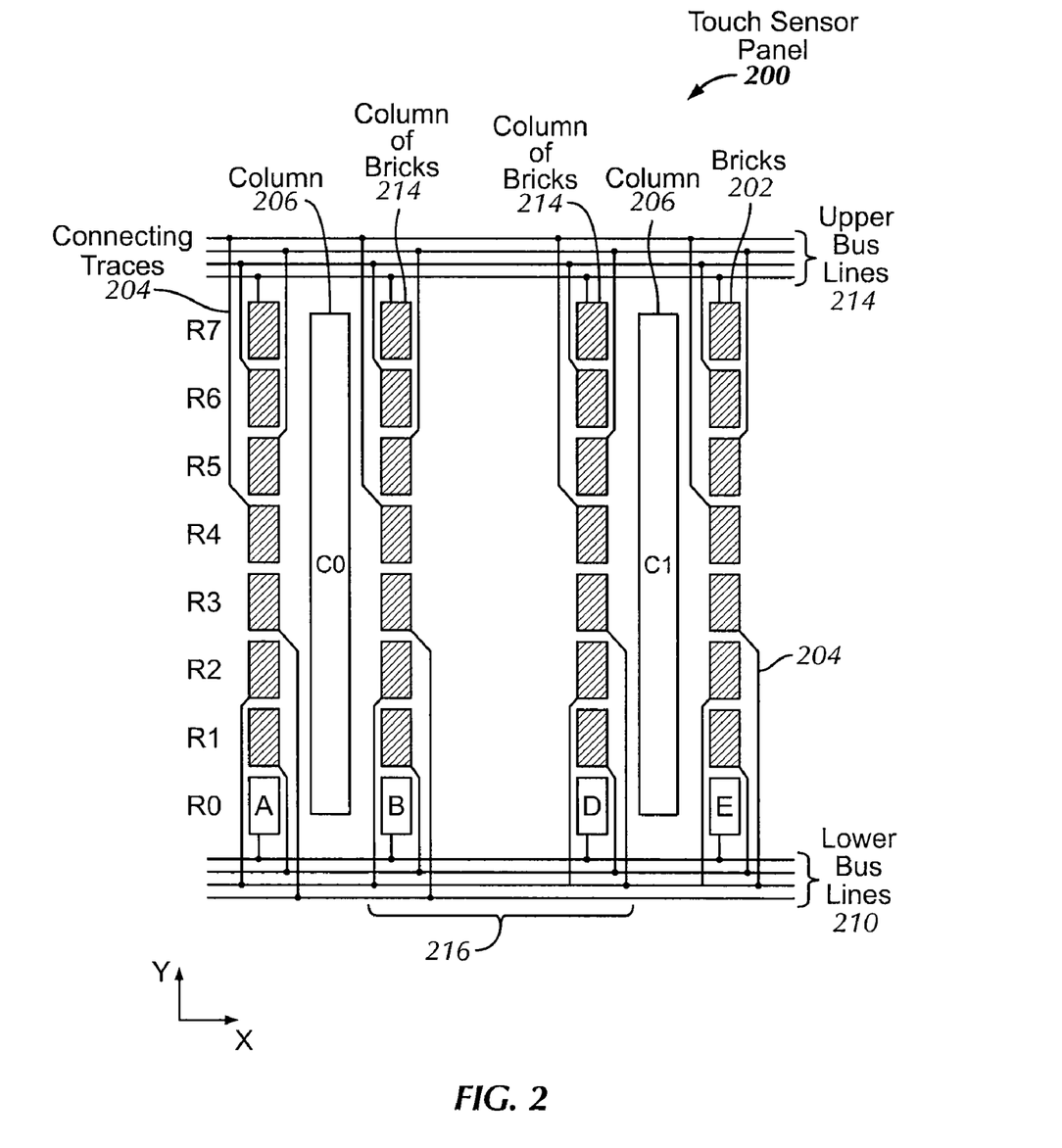
FIG. 2 illustrates another exemplary touch sensor panel including columns, rows of bricks, and connecting traces routed along both sides of the bricks in a double escape configuration, and metal bus lines running across both top and bottom of the panel.

One existing solution to maintain uniform sensitivity in large touch sensor panel is to route the connecting traces along both sides of the columns of bricks and, in addition, to install bus lines at both the top and the bottom of the panel so that half of the connecting traces connecting the top rows are routed to bus lines at the top of the panel and the other half of the connecting traces connecting the bottom rows are routed to the bus lines at the bottom of the panel. FIG. 2 illustrates an exemplary touch sensor panel 200 with these features. As illustrated, the touch sensor panel 200 includes sense (or drive) lines formed as columns 206, drive (or sense) lines formed as rows of bricks 202, and connecting traces 204 (illustrated symbolically as thin lines) routed along both sides of the bricks (a so-called "double escape" configuration). In the example of FIG. 2, sense (or drive) lines (C0-C3) can be formed as columns 206 and drive (or sense) lines (R0-R7) can be formed as rows of bricks 202, where each row of bricks forms a separate drive (or sense) line. Although a touch sensor panel 200 having two columns and eight rows is shown, it should be understood that any number of columns and rows can be employed. Columns 206 and bricks 202 of FIG. 2 can be formed in a co-planar single layer of conductive material.

In this exemplary touch sensor panel, to couple bricks 202 in a particular row together, connecting traces 204, which are also formed from a conductive material, can be routed from the bricks along alternating sides of the bricks in a double escape configuration to a particular lower bus line 210 or upper bus line 214. Lower bus lines 210 and upper bus lines 214, as well as connecting traces (not shown) for columns 406, can be routed along the border areas and brought off touch sensor panel 200 through a flex circuit. In this configuration, the number of connecting traces routed to the lower bus lines 210 can be reduced by almost half (e.g., eight connecting traces 216 are used to connect the eight lower bricks in the two center columns of bricks to the bus lines, as shown in FIG. 2, compared to 15 shown in FIG. 1c). With the other half of the connecting traces routed to the upper bus lines 214, the adjacent columns of bricks 214 can be brought closer to improve the uniformity of sensitivity of the touch sensor panel 200. In addition, the longest connecting traces (i.e., the connecting traces for bricks in rows R3 and R4) have a length that is less than half of the length of the panel in the Y-direction. However, the downside of using this configuration illustrated in FIG. 2 is that additional space between the columns of bricks 214 and the sense line columns 206 may be required because some of the connecting traces 204 in this double escape configuration are routed between the sense line columns 206 and the columns of bricks 214. In addition, border metal for the bus lines 214, 210 has to be fabricated at both the top and the bottom of the panel 200, resulting in additional cost for manufacturing the touch sensor panel 200.

Embodiments of the present invention provide touch sensor panels having segmented electrodes (e.g., bricks) for both the drive and sense lines. By segmenting both drive and sense lines and staggering the segmented electrodes in various patterns, embodiments of the invention reduce the number of drive (or sense) electrodes in each column, thereby reducing the number of connecting traces required to connect the drive (or sense) electrodes. As a result, less space is required for routing the connecting traces, making it more practical to route all connecting traces to one edge of the touch sensor panel without sacrificing the sensitivity (or uniformity of the sensitivity) of the touch sensor panel. This can eliminate the border metal on glass routing from at least one edge of the existing touch sensor panels, such as the one shown in FIG. 2, thereby reducing the manufacturing cost of the touch sensor panels.

Although some embodiments of this invention may be described and illustrated herein primarily in terms of multi-touch sensor panels, it should be understood that embodiments of this invention are not so limited, but can be additionally applicable to single-touch sensor panels. Furthermore, although the touch sensors in the sensor panel may be described and illustrated herein in terms of generally orthogonal arrangements of drive and sense lines formed as rows of rectangular bricks or pentagonal shapes, embodiments of this invention are not so limited, but can be additionally applicable to polygonal areas of other shapes and lines formed in other patterns. In addition, although the drive lines may be primarily described as oriented generally as rows and the sense lines described as oriented generally as columns, embodiments of the invention are not so limited. In other words, the drive lines may be oriented as columns and the sense lines may be oriented as rows.

One of the problems associated with existing touch sensor panels, such as the one in FIGS. 1a-1c, is that the configuration of the drive lines (i.e., rows of bricks) and sense lines (i.e., the columns) are not well balanced. For example, in FIG. 1a, the drive lines are formed by connecting eight separate bricks in the same row using connecting traces and bus lines while the sense lines are simply non-segmented columns. That translates into a 15:1 ratio of the number of connecting traces for routing drive lines and the number of connecting traces for routing sense lines. Embodiments of the invention are designed to partition the drive lines and sense lines more evenly to improve the uniformity of the touch sensor panel. At the same time, the configurations disclosed herein reduce the number of connecting traces required for routing the drive lines (or sense lines) as compared to existing touch sensor panel designs, and thus are more suitable for use in large touch sensor panels.

Figure 3:
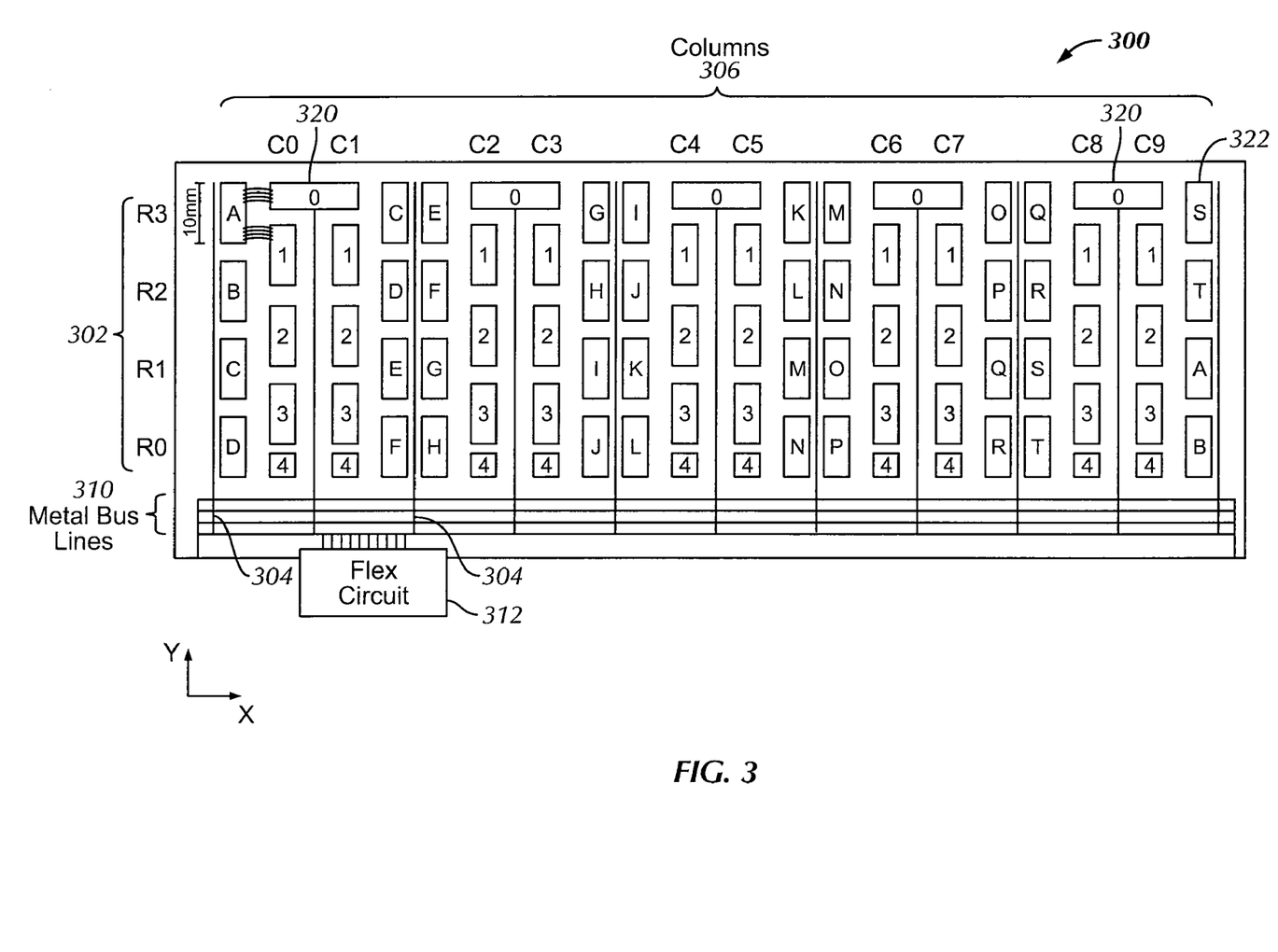
FIG. 3 illustrates an exemplary touch sensor panel having segmented sense lines and drive lines according to an embodiment of the invention.

FIG. 3 illustrates an exemplary touch sensor panel 300 having segmented sense lines and drive lines according to an embodiment of the invention. Similar to existing panels described above, the sense lines and drive lines in this embodiment may be fabricated on a single side of a substrate. As illustrated, the touch sensor panel 300 includes ten columns of sense electrodes 306 and four rows of drive electrodes 302. It should be understood that the number of columns of sense electrodes and rows of drive electrodes can vary depending on the requirements of the touch sensor panel, such as the size and sensing resolution of the panel. Each of the drive and sense electrodes 320, 322 are connected to one of the metal bus lines 310 using a connecting trace 304. The connections between the electrodes and the metal bus lines are described in greater detail below in view of FIG. 4.

Referring to FIG. 3, in this embodiment, pixels on the touch sensor panel are formed by the unique pairings of individual drive electrodes 322 and their adjacent sense electrodes 320. For illustration purposes, each drive electrode is designated with a letter (i.e., A-T) and each sense electrode is designated with a number (i.e., 0-4) in FIG. 3. For example, the leftmost column in the panel includes four drive electrodes labeled A-D, respectively, from top to bottom. The second leftmost column includes five sense electrodes labeled 0-5, respectively, from top to bottom. It is worth noting that the top sense electrode 0 is shared by two adjacent columns in this embodiment so as to eliminate an extra connecting trace and reduce the area between the sense electrodes required to route the connecting traces. In other embodiments, two separate sense electrodes, one for each column, may replace the shared electrode 0 of this embodiment.

As described above, each touch-sensing pixel of the touch sensor panel is formed by mutual capacitance between a sense electrode and a drive electrode. Using the letter/number labeling scheme described above, each touch-sensing pixel can be identified by a pairing of one letter, designating the drive electrode component of the pixel, and one number, designating the sense electrode component of the pixel. For example, drive electrode A and sense electrode 0 may form the pixel A0. Electrically, the mutual capacitance of one touch-sensing pixel can be distinguished from the mutual capacitance of another touch sensing pixel because the two mutual capacitances are formed with combinations of different drive electrodes and sense electrodes. Therefore, it is possible to determine the proximity of a touch by detecting a change in mutual capacitance at a particular touch-sensing pixel.

In this embodiment, the drive electrodes and sense electrodes are illustrated as rectangular bricks. However, it is to be understood that the electrodes can be in other polygonal shapes that allow fringing electric field lines to form between pairs of drive electrodes and sense electrodes. As illustrated in FIG. 3, the drive electrodes and sense electrodes in adjacent columns are staggered horizontally with respect to each other by half a Y-pitch of the electrodes. For example, the top half of brick A in the leftmost column is aligned with brick 0 of the adjacent column, and the bottom half of that brick A is aligned with the top half of brick 1 of the adjacent column. Similarly, the top half of brick B in the leftmost column is aligned with the bottom half of brick 1, and the bottom half of brick B is aligned with the top half of brick 2. The same horizontal staggering pattern extends all the way to the bottom electrodes in the columns and is replicated between electrodes in adjacent pairs of columns of drive electrodes and sense electrodes throughout the touch sensor panel 300.

With this horizontally staggered configuration of electrodes, each of the drive electrodes can be capacitively coupled to two different sense electrodes and, reciprocally, most of the sense electrodes can be capacitively coupled to two different drive electrodes. For example, as illustrated in FIG. 3, a first touch-sensing pixel on the panel can be formed by the fringing electric field between the top half of brick A in the leftmost column and the adjacent brick 0. A second touch-sensing pixel below the first pixel can be formed by fringing electric field between the bottom half of brick A and the top half of adjacent brick 1. The distance between the center of the two mutual capacitances A0 and A1 is approximately half of the Y-pitch of the drive electrode. One of the advantages of this design is that less electrodes, both drive and sense, are required to provide the same sensing resolution for a panel with fixed dimensions than in previously disclosed touch sensor panels (e.g., the panel of FIG. 1a). For example, compared to the touch sensor panel of FIG. 1a which uses drive electrodes (bricks) with a 5 mm Y-pitch to extract mutual capacitance values at every 5 mm interval in the Y-direction of the panel, the touch sensor panel of FIG. 3 can achieve the same 5 mm capacitance measurement interval using bricks having a 10 mm Y-pitch because each of the 10-mm Y-pitch bricks is capacitively coupled to two separate sense electrodes as described above. Effectively, the number of drive electrodes in each column can be reduced by half, thus reducing the connecting traces used to connect the electrodes to the metal bus lines. Since the connecting traces do not have to be as densely packed in a limited amount of space in this embodiment, large touch sensor panels can be created without having the high-resistance connecting trace problem described above.

Figure 4:
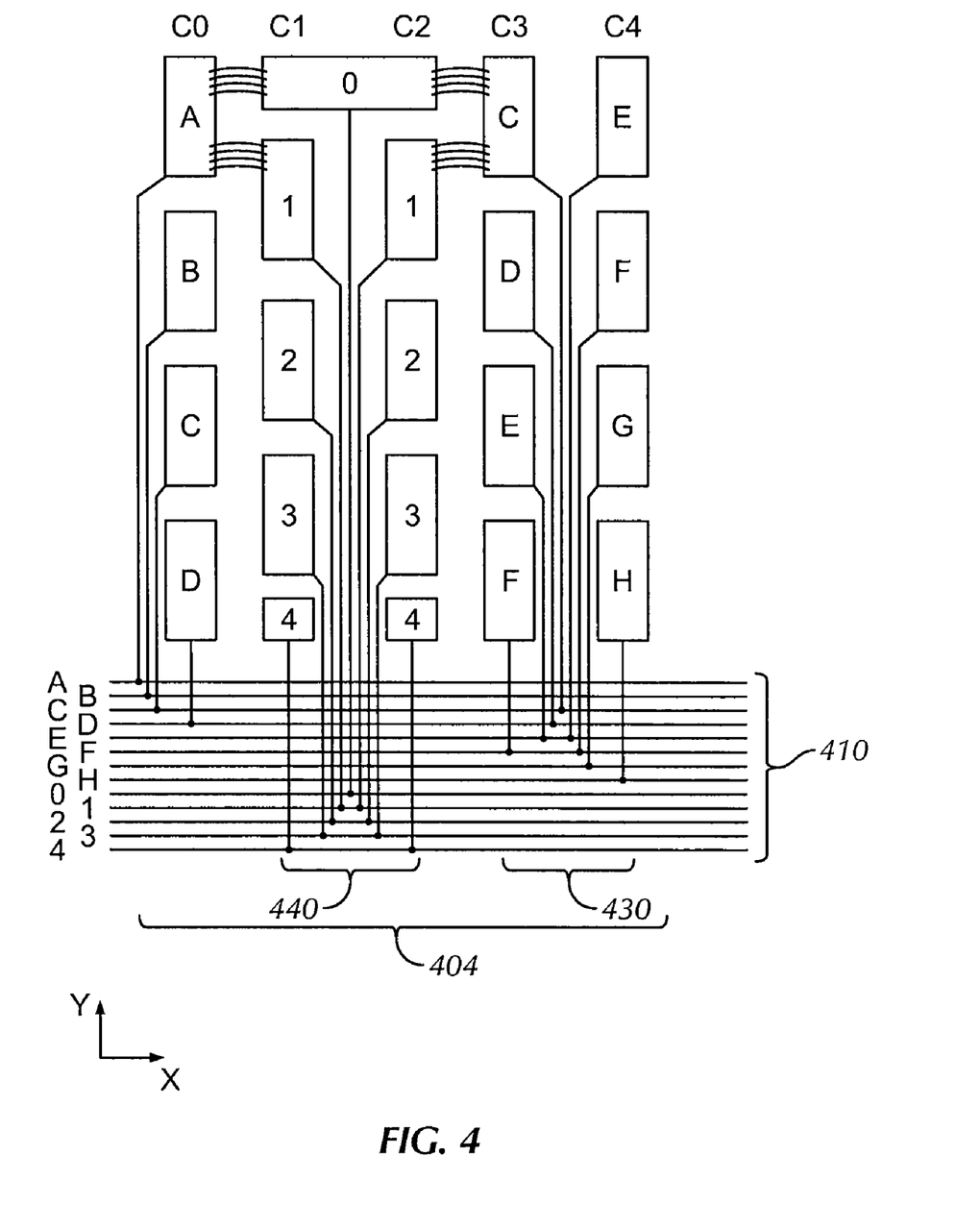
FIG. 4 illustrates a close-up view of a portion of the exemplary touch sensor panel of FIG. 3, showing bricks routed to bus lines using connecting traces according to an embodiment of the invention.

FIG. 4 provides an enlarged view of the left side of the touch sensor panel of FIG. 3. The bricks in columns C0, C3, and C4 represent drive electrodes and the bricks in the columns C1, C2 represent sense electrodes. Moreover, the connecting traces 404 and the metal bus lines 410 are shown in detail to illustrate how distinct mutual capacitance between each pair of drive and sense electrodes is obtained. As illustrated, each of the drive electrodes (A-H) and sense electrodes (0-4) is connected to a corresponding metal bus line 410 at the bottom of the panel by a connecting trace 404. The connecting traces for the drive electrodes are routed between two adjacent columns of drive electrodes (e.g. C3 and C4). The connecting traces for the sense electrodes are routed between two adjacent columns of sense electrodes (e.g., C1 and C2).

In the touch sensor panel of FIG. 1c, because only the drive line is segmented, space in the horizontal (X) direction of the touch sensor panel is not evenly distributed between drive routing (i.e., routing the connecting traces for the drive electrodes) and sense routing (i.e., routing the connecting traces for the sense columns). As shown in FIG. 1c, 15 connecting traces are routed between adjacent drive electrodes, while only one connecting trace is needed for the sense column. As a result, the distances between the adjacent touch-sensing pixels in a particular row may not be consistent. For example, the pixels corresponding to the mutual capacitances between R7C0-C0 and between R7C0'-C0 may be closer to each other than the pixels corresponding to the mutual capacitances between R7C0'-C0 and between R7C1-C1. As such, the uniformity of the sensitivity of the touch sensor panel may be negatively affected.

In comparison, by segmenting both drive and sense lines, the embodiment illustrated in FIG. 4 improves the uniformity of the sensitivity across the touch panel. As illustrated in FIG. 4, eight connecting traces 430 are routed between the two adjacent columns C3, C4 of drive electrodes and nine connecting traces 440 are routed between the two adjacent columns C1, C2 of sense electrodes. As such, the routing space for the drive electrodes is almost identical to the routing space for the sense electrodes. This allows the pixels in each row to be more evenly spaced, which improves the uniformity of the sensitivity of the touch sense panel.

In the exemplary embodiment of FIG. 4, the number of metal bus lines in the panel corresponds to the number of unique letters and numbers used to label the drive electrodes and sense electrodes, respectively. This routing scheme is different from the one used in existing panels, such as the one in FIG. 1c, which connects all drive electrodes in the same row to a particular metal bus line. In this embodiment, as illustrated in FIG. 4, all drive electrodes labeled with the same letter are connected to the metal bus line 404 also labeled with that letter. For example, the two electrodes labeled "C" are connected to metal bus line C. Similarly, all sense electrodes labeled with the same number are connected to the metal bus line 404 also labeled with that number. For example, both sense electrodes labeled 1 are connected to metal bus line 1.

In other words, the drive electrodes in each row are no longer connected to the same metal bus line as in existing touch sensor panels. For example, Bricks A and C in the top row are connected to two different metal bus lines A and C, respectively. In fact, in this embodiment, no two drive electrodes in the same row are labeled the same letter to guarantee that no two pixels in that row are identified by the same letter-number combination (e.g., two A-0s), given that the sense electrodes in the same row all have the same number designation.

Figure 5:
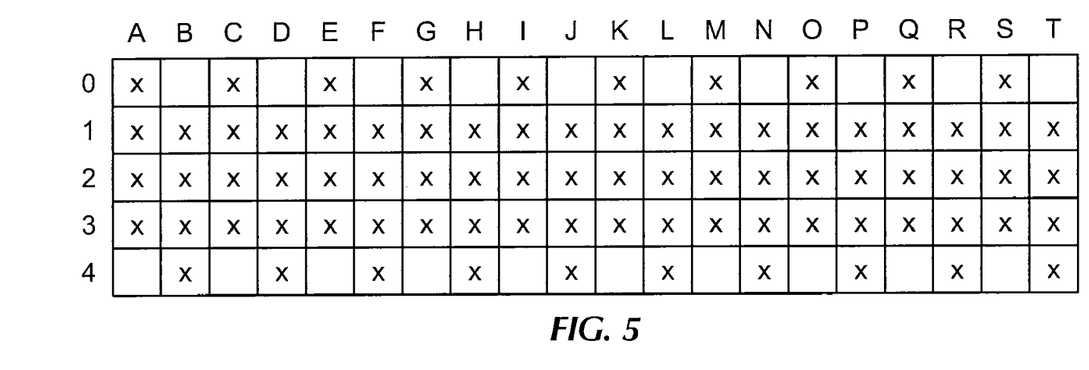
FIG. 5 illustrates a matrix corresponding to the interactions of drive lines and sense lines of the exemplary touch sensor panel of FIG. 3 according to embodiments of this invention.

Referring again to the touch sensor panel of FIG. 3, in operation, one or more touches can be sensed by stimulating one or more drive "rows" (although the electrodes in each drive row are no longer arranged in a row) either simultaneously or sequentially and using the sense electrodes capacitively coupled to the stimulated drive electrodes to detect changes in the capacitance. Although spatially, the touch sensor panel 300 of FIG. 3 includes an 8×10 matrix of touch-sensing pixels, electrically, there are actually five unique sense lines (0-4) and twenty unique drive lines (A-T) in the panel. A matrix corresponding to the interactions of drive lines and sense lines is illustrated in FIG. 5. As illustrated, the rows in the matrix represent the five sense lines (0-4) and the columns represent the 20 drive lines (A-T). The blocks having Xs in them each correspond to a touch-sensing pixel on the touch sensor panel. In one embodiment, to detect one or more touches on the touch sensor panel, all "A" drive electrodes are first stimulated at the same time. While the A electrodes are stimulated, the mutual capacitances in the five sense lines (0-4) are measured to determine whether there is a change in the capacitance that is caused by a touch. Once the measurements are taken, the A drive electrodes are stabilized. Next, all B drive electrodes are stimulated while capacitance measurements are taken in the five sense lines (0-4). The process repeats until all twenty drive lines have been stimulated. The location of the touch(es) can be determined based on the change in mutual capacitance between a drive electrode and a sense electrode. In another embodiment, more than one drive line can be stimulated simultaneously (e.g., all A drive electrodes can be stimulated with a particular frequency and phase, while at the same time, all B drive electrodes can be stimulated with the same or different frequency and phase) and the matrix can be used in conjunction with the gathered touch data to generate an image of touch.

In a typical touch sensor panel, sense lines consume more area on the panel than the drive lines. By switching from an existing configuration of drive and sense lines, (e.g., the configuration used in the panel of FIG. 1a) to the segmented-drive-and-sense-lines configuration of the above-disclosed embodiment, the number of sense lines can be reduced. For example, if the touch sensor panel of FIG. 3 with five sense lines is converted to the configuration used in the panel of FIG. 1a, a total of eight sense lines are required, one for each row of pixels on the panel. As such, more area on the panel can be saved by reducing the number of sense lines in the touch sensor panel. Although more drive lines may be needed, the drive lines consume relatively less area as compared to the sense lines and can thus be added without significantly affecting the rest of the panel.

Referring again to FIG. 3, the touch sensor panel 300 may use a labeling scheme in which the letters representing the drive electrodes are reused diagonally to avoid duplicating letter-number combinations in the panel. The labeling scheme in turn dictates how the drive lines are formed (i.e., to which metal bus line each drive electrode is connected). In other embodiments, any type of labeling scheme can be used so long as no two pixels are represented by the same letter-number combination. For example, the drive electrodes in each row may be labeled with the same letter while the sense electrodes are labeled such that the same sense electrode number is only used diagonally across the panel.

Figure 6:
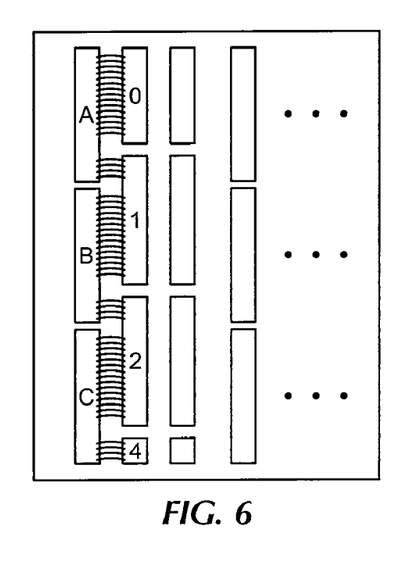
FIGS. 6 and 7 illustrate different configurations of drive and sense electrodes that may be used in the touch sensor panel according to embodiments of the invention.
Figure 7:
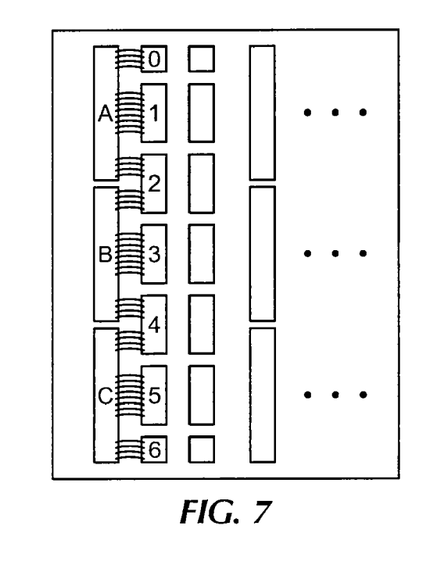

In another embodiment of the configuration of electrodes as shown in FIG. 6, the drive electrodes and the sense electrodes can be horizontally staggered in such a way that more than half of each drive electrode is capacitively coupled to one of the two adjacent sense electrodes and the rest (less than half) of the same drive electrode is capacitively coupled to the other adjacent sense electrodes. That is, the staggering between the columns of electrodes is not by exactly half a Y-pitch of the electrodes. In yet another embodiment shown in FIG. 7, the drive electrodes and the sense electrodes can be horizontally staggered in such a way that at least some of the drive electrodes may be capacitively coupled to more than two sense electrodes. For example, drive electrode A in the leftmost column forms an electric field with sense electrodes 0-2 in the adjacent column.

To summarize, one of the main advantages of having both segmented drive and sense electrodes in a configuration such as the one illustrated in FIG. 3 is that there are less connecting traces in the bottleneck area between the columns of sense electrodes. Because the disclosed horizontally-staggered pattern allows each drive electrode to be a part of two touch-sensing pixels, the number of drive electrodes can be reduced by half, thus reducing the number of connecting traces by half, resulting in significant savings in area in the touch sensor panel.

In addition, the disclosed design can be useful in a larger touch panel, particularly one that is long in the Y-direction, because twice as many connecting traces can be routed in the same amount of area as in existing panels without the need to devote more area to route the connecting traces. In one embodiment, metal bus lines can be added to the top of the panel so that the electrodes in the top half of the panel can be connected to the upper buses and electrodes in the bottom half of the panel can be connected to the lower buses, similar to the configuration shown in FIG. 2. This also allows more rows of electrodes to be added to the panel, further enlarging the touch sensitive area of the panel.

Figure 8:
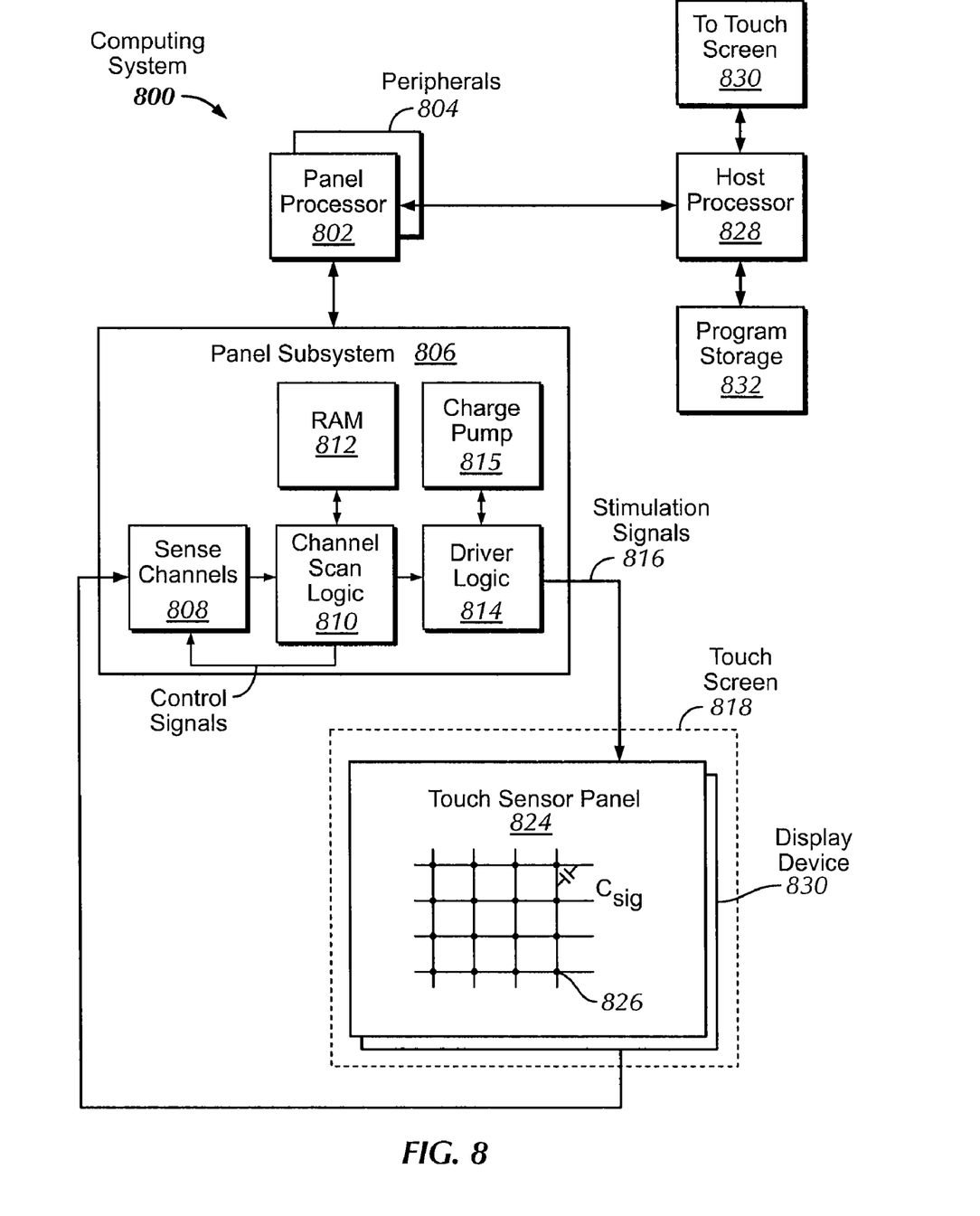
FIG. 8 illustrates an exemplary computing system operable with the touch sensor panel according to embodiments of this invention.

FIG. 8 illustrates exemplary computing system 800 that can include one or more of the embodiments of the invention described above. Computing system 800 can include one or more panel processors 802 and peripherals 804, and panel subsystem 806. Peripherals 804 can include, but are not limited to, random access memory (RAM) or other types of memory or storage, watchdog timers and the like. Panel subsystem 806 can include, but is not limited to, one or more sense channels 808, channel scan logic 810 and driver logic 814. Channel scan logic 810 can access RAM 812, autonomously read data from the sense channels and provide control for the sense channels. In addition, channel scan logic 810 can control driver logic 814 to generate stimulation signals 816 at various frequencies and phases that can be selectively applied to drive lines of touch sensor panel 824. In some embodiments, panel subsystem 806, panel processor 802 and peripherals 804 can be integrated into a single application specific integrated circuit (ASIC).

Touch sensor panel 824 can include a capacitive sensing medium having a plurality of drive lines and a plurality of sense lines, although other sensing media can also be used. In mutual capacitance embodiments, each intersection of drive and sense lines can represent a capacitive sensing node and can be viewed as picture element (pixel) 826, which can be particularly useful when touch sensor panel 824 is viewed as capturing an "image" of touch. (In other words, after panel subsystem 806 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 824 can be coupled to a sense channel 808 (also referred to herein as an event detection and demodulation circuit) in panel subsystem 806. The touch sensor panel 824 can be one embodiment of the SITO touch sensor panel with segmented drive and sense electrodes as described above.

Computing system 800 can also include host processor 828 for receiving outputs from panel processor 802 and performing actions based on the outputs that can include, but are not limited to, moving an object such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 828 can also perform additional functions that may not be related to panel processing, and can be coupled to program storage 832 and display device 830 such as an liquid crystal display (LCD) for providing a user interface (UI) to a user of the device. Display device 830 together with touch sensor panel 824, when located partially or entirely under the touch sensor panel, can form touch screen 818.

Figure 9A:
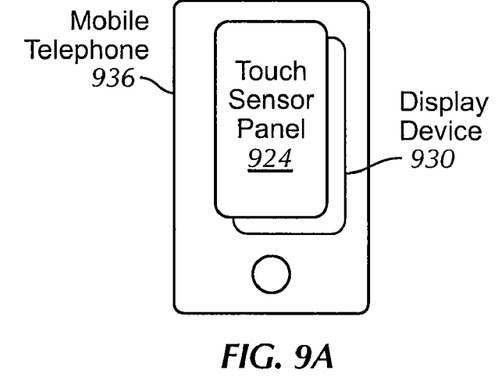
FIG. 9a illustrates an exemplary mobile telephone that can include the touch sensor panel according to embodiments of the invention.

FIG. 9A illustrates exemplary mobile telephone 936 that can include touch sensor panel 924 and display device 930. The touch sensor panel can be one embodiment of the SITO touch sensor panel with segmented drive and sense electrodes as described above.

Figure 9B:
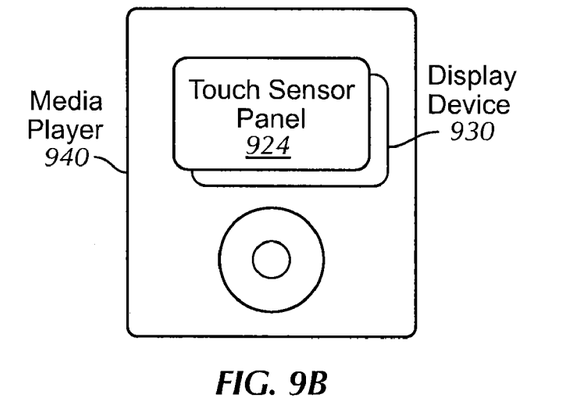
FIG. 9b illustrates an exemplary media player that can include the touch sensor panel according to embodiments of the invention.

FIG. 9B illustrates exemplary digital media player 940 that can include touch sensor panel 924 and display device 930. The touch sensor panel can be one embodiment of the SITO touch sensor panel with segmented drive and sense electrodes as described above.

Figure 9C:
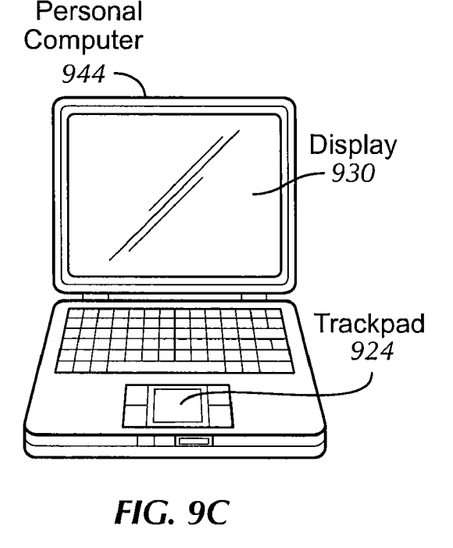
FIG. 9c illustrates an exemplary personal computer that can include the touch sensor panel according to embodiments of the invention.

FIG. 9C illustrates an exemplary personal computer 944 that can include touch sensor panel 924 and display device 930. The touch sensor panel 924 can be one embodiment of the SITO touch sensor panel with segmented drive and sense electrodes as described above. The display device can also include an embodiment of the above-disclosed touch sensor panel.

Figure 9D:
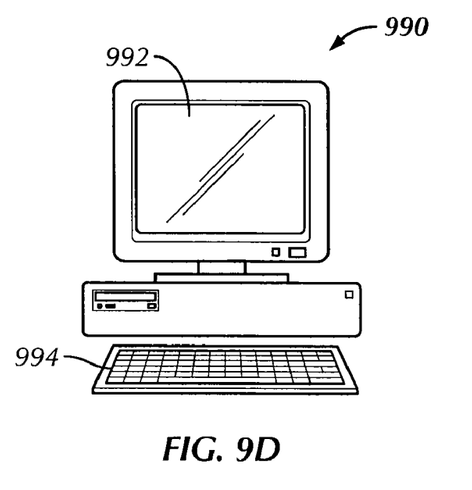
FIG. 9d illustrates another exemplary personal computer that can include the touch sensor panel according to embodiments of the invention.

FIG. 9D illustrates a desktop computer 990 including a display device 992. The display device 992 may include an embodiment of the above-disclosed touch sensor panel with segmented drive and sense electrodes. The desktop computer 990 may also include a virtual keyboard 994 which incorporates an embodiment of the above-disclosed touch sensor panel with segmented drive and sense electrodes.

The mobile telephone, media player, personal computer, and desktop computer of FIGS. 9A, 9B, 9C, and 9D can advantageously benefit from incorporating embodiments of the disclosed SITO touch sensor panel with segmented drive and sense electrodes by providing an improved user interface.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A touch sensor panel, comprising:
    a plurality of first polygonal areas partitioned in a plurality of first columns formed on a single layer and supported on one side of a substrate, each of the first columns including at least two of the first polygonal areas;
    a plurality of second polygonal areas partitioned in a plurality of second columns formed on the same layer as the plurality of first polygonal areas, each of the second columns including at least two of the second polygonal areas;
    a plurality of first connecting traces formed on the same layer as the plurality of first polygonal areas, each first connecting trace coupled to a different first polygonal area; and
    a plurality of second connecting traces formed on the same layer as the plurality of second polygonal areas, each second connecting trace coupled to a different second polygonal area,
    wherein the plurality of first polygonal areas and the plurality of second polygonal areas form an array of capacitive sensors, each capacitive sensor comprising one of the first polygonal areas and one of the second polygonal areas.

2. The touch sensor panel of claim 1, wherein the plurality of first polygonal areas are staggered with respect to the plurality of second polygonal areas.

3. The touch sensor panel of claim 1, wherein each of the plurality of first polygonal areas represents a drive electrode, and wherein each of the plurality of second polygonal areas represents a sense electrode.

4. The touch sensor panel of claim 3, wherein each of the first drive electrodes is capacitively coupled to at least two sense electrodes.

5. The touch sensor panel of claim 3, wherein each of the drive electrodes are associated with a particular one of a plurality of drive lines, each of the sense electrodes are associated with a particular one of a plurality of sense lines, and the drive and sense electrodes are arranged such that each capacitive sensor in the touch sensor panel is formed from a drive and sense electrode pair associated with a unique drive and sense line pair.

6. The touch sensor panel of claim 3 wherein the drive electrodes are arranged such that all of the drive electrodes associated with a particular drive line are arranged in a repeating diagonal pattern.

7. The touch sensor panel of claim 1, further comprising a plurality of bus lines formed along at least one edge of the substrate on the same side of the substrate as the plurality of first polygonal areas, each of the first connecting traces and second connecting traces coupled to the one of the bus lines.

8. The touch sensor panel of claim 7 wherein, for the first polygonal area and the second polygonal comprising any given capacitive sensor, the first and second polygonal areas are coupled to different bus lines.

9. The touch sensor panel of claim 1, each of the plurality of first columns is adjacent to at least one of the plurality of second columns, and wherein the first polygonal areas in the plurality of first columns are staggered with respect to the second polygonal areas in the plurality of second columns.

10. The touch sensor panel of claim 1, the touch sensor panel integrated within a computer system.

11. The touch sensor panel of claim 10, the computer system integrated within a mobile telephone.

12. The touch sensor panel of claim 10, the computer system integrated within a media player.

13. A touch sensor panel, comprising:
a plurality of drive lines formed on a single layer and supported on one side of a substrate, each of the plurality of drive lines comprising a plurality of a first polygonal areas; and
a plurality of sense lines formed on the same layer as the plurality of first polygonal areas, each of the plurality of sense lines comprising a plurality of a second polygonal areas;
wherein the plurality of first polygonal areas and the plurality of second polygonal areas form an array of capacitive sensors, each capacitive sensor comprising one of the first polygonal areas and one of the second polygonal areas.

14. The touch sensor panel of claim 13, wherein the plurality of first polygonal areas are staggered with respect to the plurality of second polygonal areas.

15. The touch sensor panel of claim 13, wherein each of the first polygonal areas is capacitively coupled to at least two second polygonal areas.

16. The method for fabricating a touch sensor panel, comprising:
forming a plurality of first polygonal areas partitioned in a plurality of first columns and a plurality of second polygonal areas partitioned in a plurality of second columns on a single layer and supported on one side of a substrate, each of the first columns including at least two of the first polygonal areas and each of the second columns including at least two of the second polygonal areas;
coupling each of the plurality of first polygonal areas to a plurality of first bus lines via first connecting traces, the first bus lines formed along at least one edge of the substrate on the same side of the substrate as the plurality of first polygonal areas, the first connecting traces routed on the same layer as the plurality of the first polygonal areas; and
coupling each of the a plurality of second polygonal areas to a plurality of second bus lines via second connecting traces, the second bus lines formed along at least one edge of the substrate on the same side of the substrate as the plurality of second polygonal areas, the second connecting traces routed on the same layer as the plurality of the second polygonal areas,
wherein the plurality of first polygonal areas and the plurality of second polygonal areas form an array of capacitive sensors, each capacitive sensor comprising one of the first polygonal areas and one of the second polygonal areas.

17. The method of claim 16, further comprising staggering the plurality of first polygonal areas with respect to the plurality of second polygonal areas.

18. The method of claim 16, wherein each of the plurality of first polygonal areas represents a drive electrode, and wherein each of the plurality of second polygonal areas represents a sense electrode.

19. The method of claim 18, wherein each of the drive electrodes are associated with a particular one of a plurality of drive lines, each of the sense electrodes are associated with a particular one of a plurality of sense lines, and the drive and sense electrodes are arranged such that each capacitive sensor in the touch sensor panel is formed from a drive and sense electrode pair associated with a unique drive and sense line pair.

20. The method of claim 19, wherein the drive electrodes are arranged such that all of the drive electrodes associated with a particular drive line are arranged in a repeating diagonal pattern.

21. The method of claim 18, further comprising capacitively coupling each of the first drive electrodes to at least two sense electrodes.

22. The method of claim 16, wherein for the first polygonal area and the second polygonal comprising any given capacitive sensor, the first and second polygonal areas are coupled to different bus lines.

23. The method of claim 16, wherein each of the plurality of the second columns is adjacent to at least one of the plurality of first columns; and
staggering the plurality of first columns with respect to the plurality of second columns.

24. A handheld electronic device including a touch sensor panel, the touch sensor panel comprising:
a plurality of first polygonal areas partitioned in a plurality of first columns formed on a single layer and supported on one side of a substrate, each of the first columns including at least two of the first polygonal areas;
a plurality of second polygonal areas partitioned in a plurality of second columns formed on the same layer as the plurality of first polygonal areas, each of the second columns including at least two of the second polygonal areas;
a plurality of first connecting traces formed on the same layer as the plurality of first polygonal areas, each first connecting trace coupled to a different first polygonal area; and
a plurality of second connecting traces formed on the same layer as the plurality of second polygonal areas, each second connecting trace coupled to a different second polygonal area, wherein the plurality of first polygonal areas and the plurality of second polygonal areas form an array of capacitive sensors, each capacitive sensor comprising one of the first polygonal areas and one of the second polygonal areas.

25. A personal computer including a touch sensor panel, the touch sensor panel comprising:
    a plurality of first polygonal areas partitioned in a plurality of first columns formed on a single layer and supported on one side of a substrate, each of the first columns including at least two of the first polygonal areas;
    a plurality of second polygonal areas partitioned in a plurality of second columns formed on the same layer as the plurality of first polygonal areas, each of the second columns including at least two of the second polygonal areas;
    a plurality of first connecting traces formed on the same layer as the plurality of first polygonal areas, each first connecting trace coupled to a different first polygonal area; and
    a plurality of second connecting traces formed on the same layer as the plurality of second polygonal areas, each second connecting trace coupled to a different second polygonal area,
    wherein the plurality of first polygonal areas and the plurality of second polygonal areas form an array of capacitive sensors, each capacitive sensor comprising one of the first polygonal areas and one of the second polygonal areas.

26. The personal computer of claim 25, wherein the touch sensor panel is integrated with a display screen.

27. The personal computer of claim 25, wherein the touch sensor panel is integrated with a trackpad.

28. The personal computer of claim 25, wherein the touch sensor panel is integrated with a virtual keyboard.

* * * * *

UNITED STATES PATENT AND TRADEMARK OFFICE
CERTIFICATE OF CORRECTION

PATENT NO. : 8,319,747 B2  
APPLICATION NO. : 12/333250  
DATED : November 27, 2012  
INVENTOR(S) : Steve Porter Hotelling et al.

Page 1 of 1

It is certified that error appears in the above-identified patent and that said Letters Patent is hereby corrected as shown below:

On the Title Page:

In the Abstract, line 1, delete "sensor panels" and insert -- sensor panel --.

In the Claims:

At column 13, claim 7, line 20, please delete "the".

At column 13, claim 8, lines 21-22, delete "polygonal comprising" and insert -- polygonal area comprising --.

At column 13, claim 13, line 39, delete "a".

At column 13, claim 13, line 43, delete "a".

At column 14, claim 16, line 6, delete "the a" and insert -- a --.

At column 14, claim 22, line 41, delete "polygonal comprising" and insert -- polygonal area comprising --.

Signed and Sealed this  
Ninth Day of July, 2013

Teresa Stanek Rea  
*Acting Director of the United States Patent and Trademark Office*